United States Patent
Ono et al.

(10) Patent No.: US 8,593,799 B2
(45) Date of Patent: Nov. 26, 2013

(54) STAND AND DISPLAY DEVICE INCLUDING STAND

(75) Inventors: Hiroyuki Ono, Tokyo (JP); Makoto Koizumi, Tokyo (JP); Naoto Sukou, Chiba (JP); Nobuyuki Hara, Kanagawa (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 13/104,092

(22) Filed: May 10, 2011

(65) Prior Publication Data

US 2011/0286164 A1    Nov. 24, 2011

(30) Foreign Application Priority Data

May 19, 2010   (JP) .............................. P2010-115241

(51) Int. Cl.
   *H05K 7/16*   (2006.01)
(52) U.S. Cl.
   USPC .............. 361/679.22; 361/679.21; 248/125.9; 16/337
(58) Field of Classification Search
   USPC ............. 361/679.01, 679.21, 679.26, 679.27, 361/679.08, 679.09, 679.22; 248/917–924, 248/125.9, 371, 372.1, 397, 133, 130, 248/122.1, 122; 16/223
   See application file for complete search history.

(56) References Cited

U.S. PATENT DOCUMENTS

| 2,887,973 | A  |   | 3/1959 | Carlson |
| 5,498,165 | A  | * | 3/1996 | Tseng .............................. 439/31 |
| 7,997,550 | B2 | * | 8/2011 | Kuhn ........................... 248/276.1 |
| 2005/0097797 | A1 |   | 5/2005 | Wang et al. |
| 2006/0049327 | A1 |   | 3/2006 | Chen |
| 2006/0144186 | A1 |   | 7/2006 | Chih et al. |
| 2006/0146487 | A1 |   | 7/2006 | Huang |
| 2007/0008686 | A1 | * | 1/2007 | Jang .............................. 361/681 |

FOREIGN PATENT DOCUMENTS

| JP | 57-042293 | 3/1982 |
| JP | 2007-159048 | 6/2007 |
| NL | 1009403 | 12/1999 |

OTHER PUBLICATIONS

English-language extended European Search Report in corresponding EP 11 165 092.5, mailed Jun. 22, 2012.

* cited by examiner

*Primary Examiner* — Hoa C Nguyen
*Assistant Examiner* — Ingrid Wright
(74) *Attorney, Agent, or Firm* — Finnegan Henderson Farabow Garrett & Dunner LLP (57) ABSTRACT

A stand includes: a base including a front arm and a rear arm each in which a rod including thread parts at both ends is bent with the both ends facing each other; a hinge unit including two joint members each of which has at least two through-holes, and arranged such that the thread part at the one end of the front arm and the thread part at the one end of the rear arm screw into one of the through-holes of the two joint members, and the thread part at the other end of the front arm and the thread part at the other end of the rear arm screw into the other of the through-holes of the two joint members; and a bracket including an attachment fixed onto an object to be supported, and fixed onto the two joint members.

19 Claims, 13 Drawing Sheets

STAND AND DISPLAY DEVICE INCLUDING STAND

BACKGROUND OF THE INVENTION

1. Field of the Invention

The present invention relates to a stand suitable for a low-profile television device and the like, and a display device including the same.

2. Description of the Related Art

In recent years, upsizing and thinning of display devices for various broadcast waves, videos, and the like have been more and more progressed, and, at the same time, stands for installing the display devices are desired to have sufficient strength to support the weight of main bodies. In many of such stands of the display devices, a supporting post stands on a flat bottom plate, and a display body is installed onto the supporting post (for example, see Japanese Unexamined Patent Publication No. 2007-159048 (FIG. 1)).

SUMMARY OF THE INVENTION

However, in the case where such a stand of related art is applied to a large-size display device of 40 inches to 60 inches, it is necessary for the stand to have the weight of a certain level, and to be provided with the installation floor area of a certain level, in relation to the center of gravity of the stand itself for preventing a turnover. Thus, the volume of a package box is increased when the stand is attached onto the main body, and there is generated an issue that the transporting efficiency is reduced, or the like. In the case where the stand is removed from the main body, and the bottom plate and the supporting post are disassembled for packing, complicated assembly operation is necessary at the time of installation.

In view of the foregoing, it is desirable to provide a stand capable of simplifying installation operation while reducing a volume of a package box, and a display device including the same.

According to an embodiment of the present invention, there is provided a stand including the following elements A to C:

A: a base including a front arm and a rear arm each in which a rod including thread parts at both ends is bent with the both ends facing each other, the front arm and the rear arm being arranged such that the thread pan at one end of the front arm and the thread part at one end of the rear arm are adjacent to each other, and the thread part at the other end of the front arm and the thread part at the other end of the rear arm are adjacent each other;

B: a hinge unit including two joint members each of which has at least two through-holes, and arranged such that the thread part at the one end of the front arm and the thread part at the one end of the rear arm screw into one of the through-holes of the two joint members, and the thread part at the other end of the front arm and the thread part at the other end of the rear arm screw into the other of the through-holes of the two joint members; and C: a bracket including an attachment fixed onto an object to be supported, and fixed onto the two joint members.

According to an embodiment of the present invention, there is provided a display device including a flat-plate main body displaying an image, and a stand regarding the main body as an object to be supported. The stand is constituted of the above-mentioned stand of the embodiment of the present invention.

In the stand according to the embodiment of the present invention, or the display device according to me embodiment of the present invention, the front arm and the rear arm formed by bending the rods are the base, and the thread parts at the both ends of the front arm and the rear arm screw into the through-holes of the joint members. Therefore, the front arm and the rear arm rotate to be openable and closable by using the joint members as an axis. Further, the main body as being the object to be supported is fixed onto the attachment of the bracket, and the bracket is fixed onto the joint members. Therefore, the front arm and the rear arm are openable arid closable without disassembly of the stand from the object to be supported. Thus, the stand attached onto the object to be supported is packed in the state that the front arm and the rear arm are closed, and it is thereby possible to reduce the volume of a package box. Further, the front arm and the rear arm are opened after unpacking, and immediate installation without complicated assembly operation is thereby possible.

According to the stand of the embodiment of the present invention, or the display device of the embodiment of the present invention, the front arm and the rear arm formed by bending the rods are the base, and the thread parts at the both ends of the front arm and the rear arm screw into the through-holes of the joint members. Therefore, the front arm and the rear arm rotate to be openable and closable by using the joint members as the axis. Further, the main body as being the object to be supported is fixed onto the attachment of the bracket, and the bracket is fixed onto the joint members. Therefore, the front arm and the rear arm are openable and closable without disassembly of the stand from the main body as being the object to be supported. Thus, it is possible to simplify the installation operation while the volume of the package box is reduced.

Other and further objects, features and advantages of the invention will appear more fully from the following description.

BRIEF DESCRIPTION OF THE DRABLADE SECTIONS

DETAILED DESCRIPTION OF THE PREFERRED EMBODIMENT

An embodiment of the present invention will be hereinafter described in detail with reference to the drawings.

Figure 1:
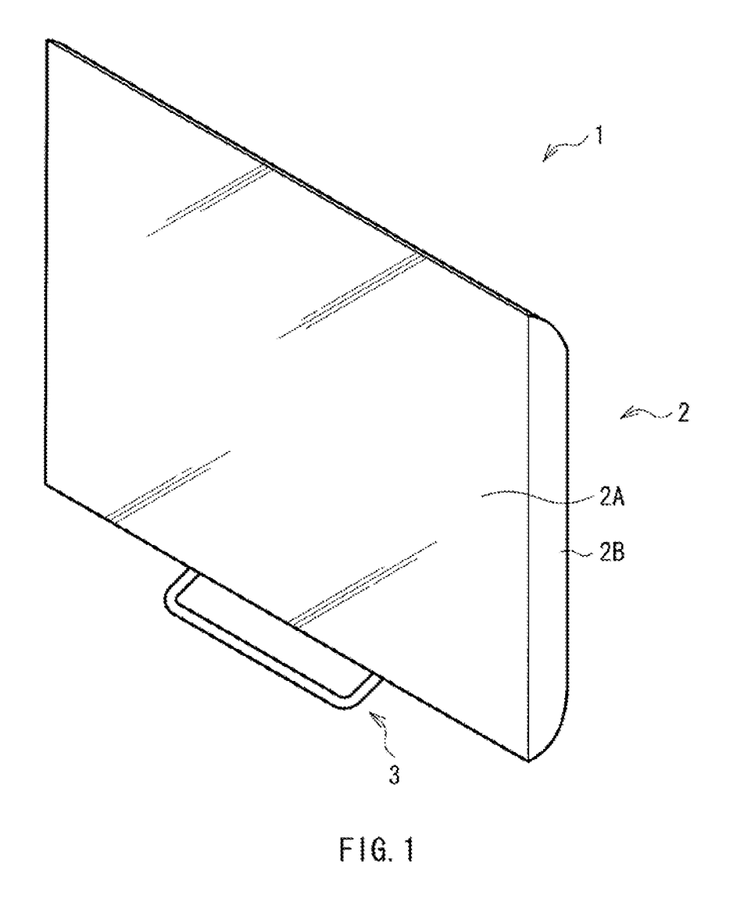
FIG. 1 is a perspective view illustrating the appearance of a display device according to an embodiment of the present invention.

FIG. 1 illustrates the appearance of a display device according to an embodiment of the present invention. A display device 1 is, for example, used as a low-profile television device, and has the structure in which a flat-plate main body 2 displaying an image is supported by a stand 3. Although the display device 1 is used as a stationary type to be placed on a horizontal plane such as a floor, a rack, and a pedestal in the state that the stand 3 is attached onto the main body 2, the display device 1 may be used as a wall-hung type in the state that the stand 3 is removed from the main body 2.

In the main body 2, a flat-plate display panel (not illustrated in the figure) made of liquid crystal or the like is accommodated between a front glass 2A made of a transparent plate glass and a rear housing 2B made of a resin or a metal. A user can watch a picture displayed on the display panel through the front glass 2A. Instead of the liquid crystal, the display panel may use other display elements such as plasma, organic EL (electroluminescence), inorganic EL, electrodeposition, or electrochromic display elements. The weight of the main body 2 is 14 kg to 20 kg in a liquid crystal display device of a 40-inch class, 30 kg to 36 kg in a liquid crystal display device of a 52-inch class, and approximately 42 kg in a liquid crystal display device of a 60-inch class.

Figure 2:
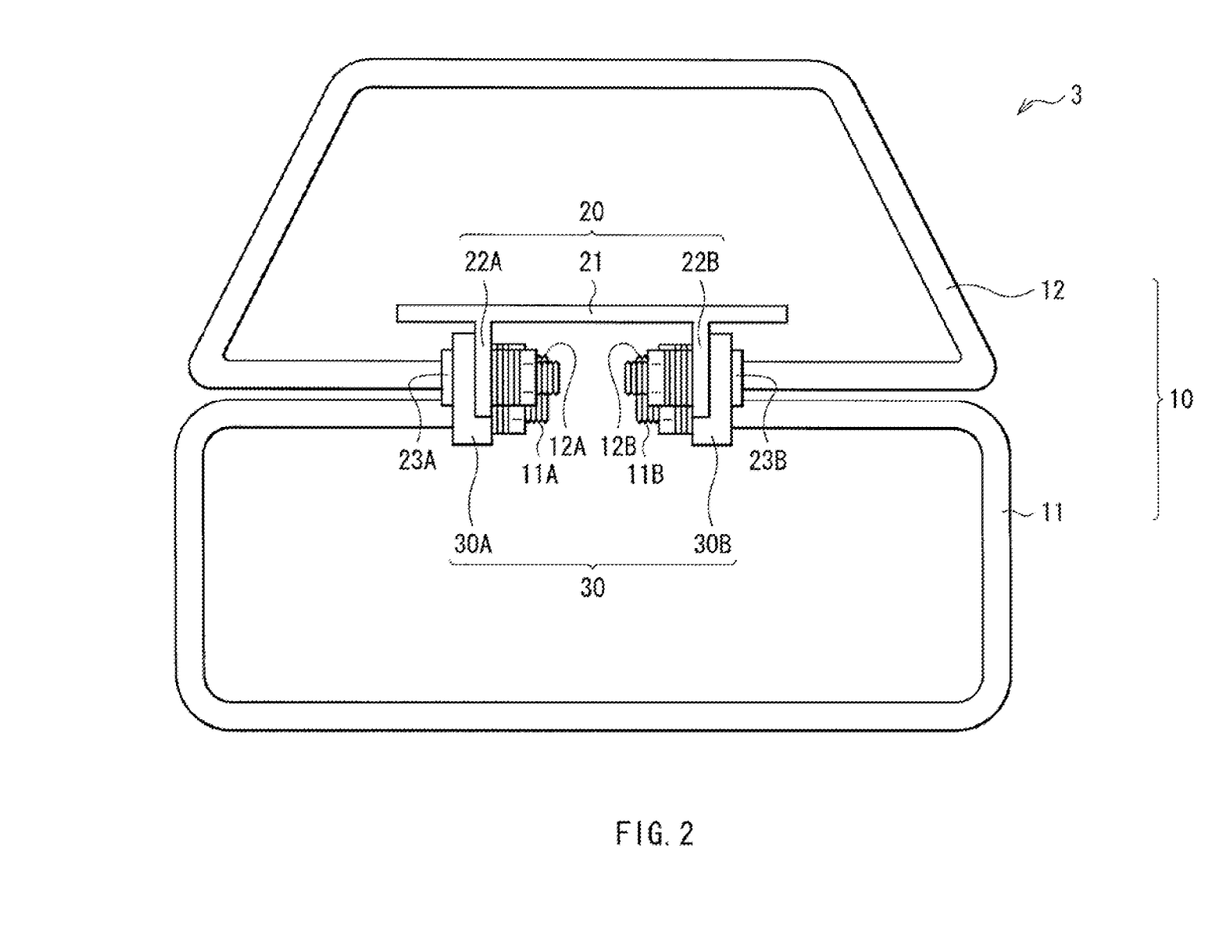
FIG. 2 is a plan view illustrating the overall structure of a stand illustrated in FIG. 1 as viewed from above.
Figure 3:
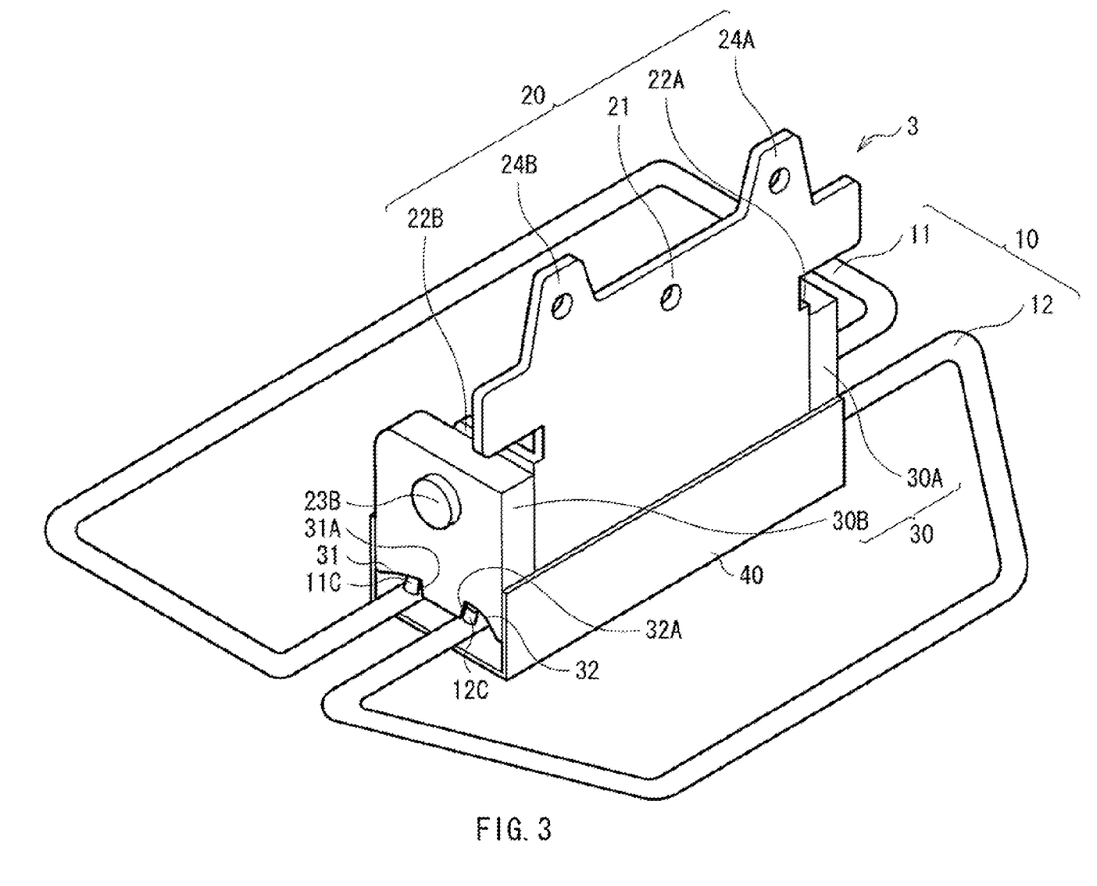
FIG. 3 is a perspective view illustrating the structure of the stand as viewed from the back side.

FIG. 2 illustrates the overall structure of the stand 3 as viewed from above, and FIG. 3 illustrates the overall structure of the stand 3 as viewed from the back side. The stand 3 has the structure in which a base 10 placed in the installation place of the display device 1, and a bracket 20 supporting the main body 2 to be supported are coupled and integrated by a hinge unit 30. If necessary, the lower part of the hinge unit 30 is covered by a cover 40.

The base 10 includes a front arm 11 and a rear arm 12. To form the front arm 11, for example, a circular rod including thread parts 11A and 11B at both ends and made of metal such as stainless steel is bent in a rectangular shape with the both ends facing each other. To form the rear arm 12, for example, a circular rod including thread parts 12A and 12B at both ends and made of metal such as stainless steel is bent in a trapezoidal shape with the both ends facing each other. The thread part 11A at one end of the front arm 11 and the thread part 12A at one end of the rear arm 12 are adjacent to each other, and the thread part 11B at the other end of the front arm 11 and the thread part 12B at the other end of the rear arm 12 are adjacent to each other so that the front arm 11 and the rear arm 12 are placed side by side. In the rods constituting the front arm 11 and the rear arm 12, it is enough if at least, the thread parts 11A, 11B, 12A, and 12B are circular rods, and the cross-sectional shape of a portion other than the thread parts 11A, 11B, 12A, and 12B may be in a polygonal shape without being limited to the circular shape. The bent shapes of the front arm 11 and the rear arm 12 are not limited to a square shape such as the rectangular shape and the trapezoidal shape, and the front arm 11 and the rear arm 12 may be bent in the same shape.

Figure 4:
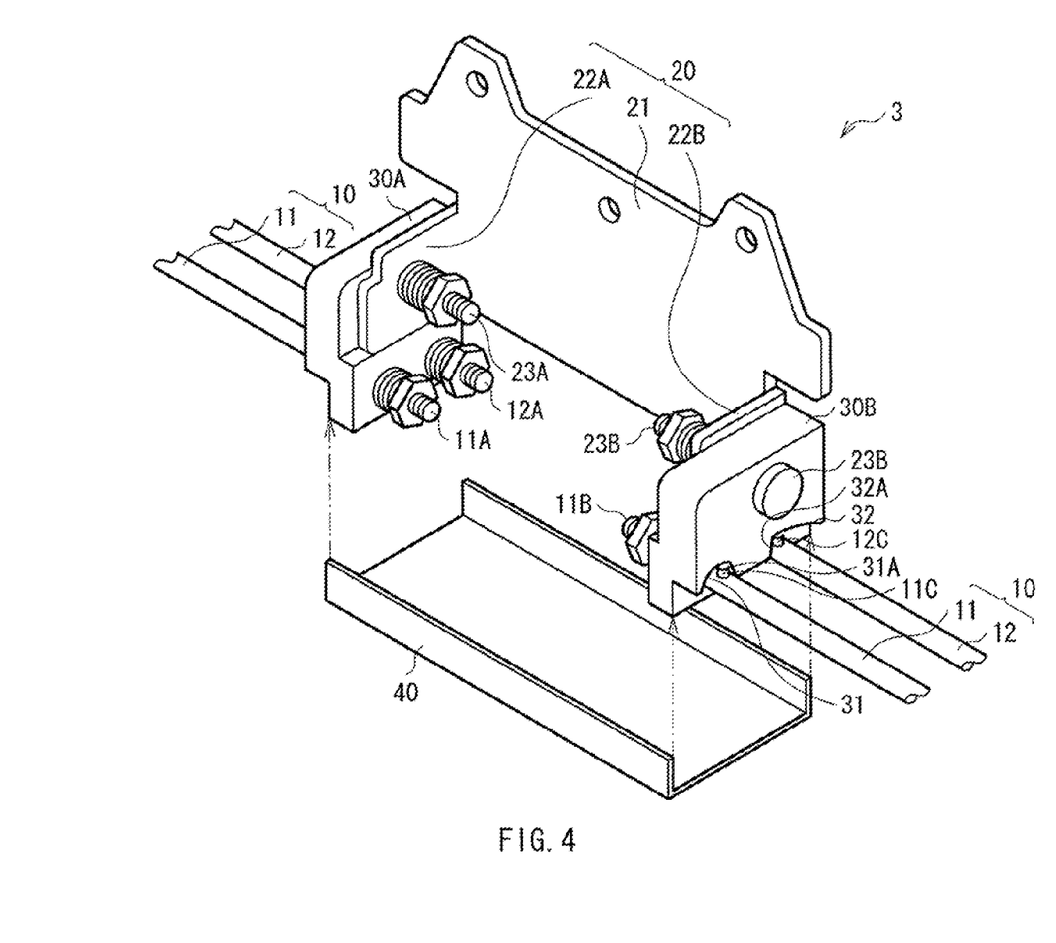
FIG. 4 is a perspective view illustrating a hinge unit and a bracket illustrated in FIG. 2 in an enlarged manner.
Figure 5A:
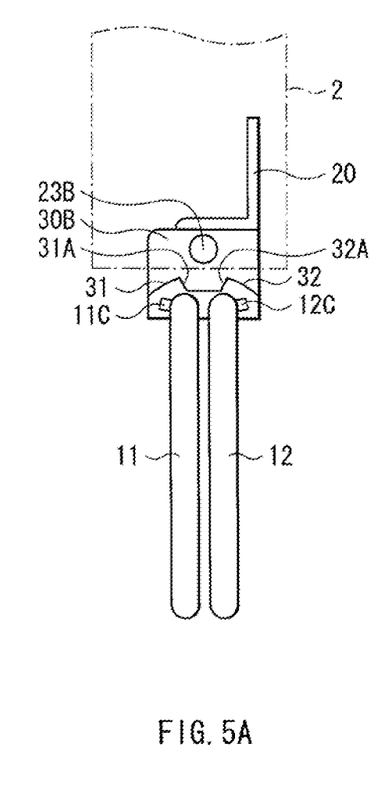
FIGS. 5A and 5B are views for explaining opening/closing of a front arm and a rear arm illustrated in FIG. 3.
Figure 5B:
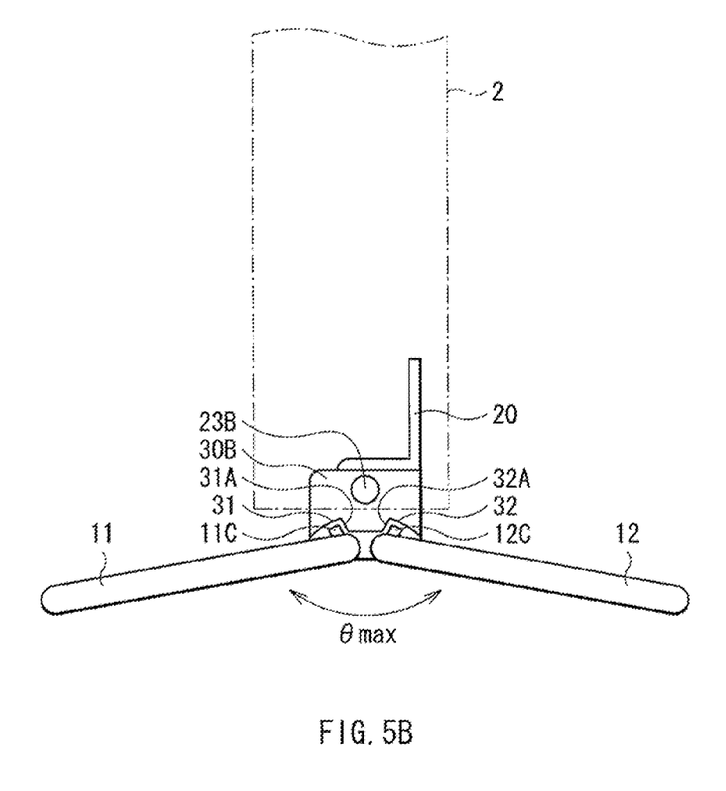

FIG. 4 illustrates the structures of the hinge unit 30 and the bracket 20 as viewed from the front side. The hinge unit 30 has a function as a hinge opening and closing the front arm 11 and the rear arm 12, and includes two joint members 30A and 30B. The joint members 30A and 30B are, for example, configured by die-casting aluminum (Al) or the like, and each provided with a total of three through-holes of two on the lower side arid one on the upper side. The thread part 11A at the one end of the front arm 11 and the thread part 12A at the one end of the rear arm 12 screw into the two through-holes on the lower side of the joint member 30A. The thread part 11B at the other end of the front arm 11 and the thread part 12B at the other end of the rear arm 12 screw into the two through-holes on the lower side of the joint member 30B. Specifically, the thread parts 11A, 11B, 12A, and 12B of the front arm 11 and the rear arm 12 are inserted into the through-holes of the joint members 30A and 30B in the state that thrust washers (not illustrated in the figure), springs (not illustrated in the figure), or the like are stacked to apply side pressure thereto so that the thread parts 11A, 11B, 12A, and 12B are rotatable. Thereby, in the stand 3, the front arm 11 and the rear arm 12 rotate to be openable and closable by using the joint members 30A and 30B as axes, as illustrated in FIGS. 5A and 5B.

The bracket 20 illustrated in FIG. 4 includes an attachment 21 fixed onto the main body 2 to be supported, and the bracket is fixed onto the joint members 30A and 30B. Thereby, as illustrated in FIGS. 5A and 5B, in the stand 3, the front arm 11 and the rear arm 12 are openable and closable without disassembly of the stand 3 from the main body 2 to be supported. Screw holes for fixing the main body 2 are appropriately provided in the attachment 21. Ear portions 22A and 22B bent at 90 degrees from the attachment 21 are provided at both ends of the attachment 21. The ear portion 22A is fixed onto the joint member 30A, and the ear portion 22B is fixed onto the joint member 30B, respectively.

When the above is summarized, in the stand 3, the front arm 11 and the rear arm 12 formed by bending the rods are the base 10, and the thread parts 11A and 11B at the both ends of the front arm 11, and the thread parts 12A and 12B at the both ends of the rear arm 12 screw into the through-holes of the joint members 30A and 30B. Further, the main body 2 to be supported is fixed onto the attachment 21 of the bracket 20, and the bracket 20 is fixed onto me joint members 30A and 30B. Thereby, in the stand 3 and the display device 1 including the stand 3, it is possible to simplify the installation operation while the volume of a package box is reduced.

Figure 6:
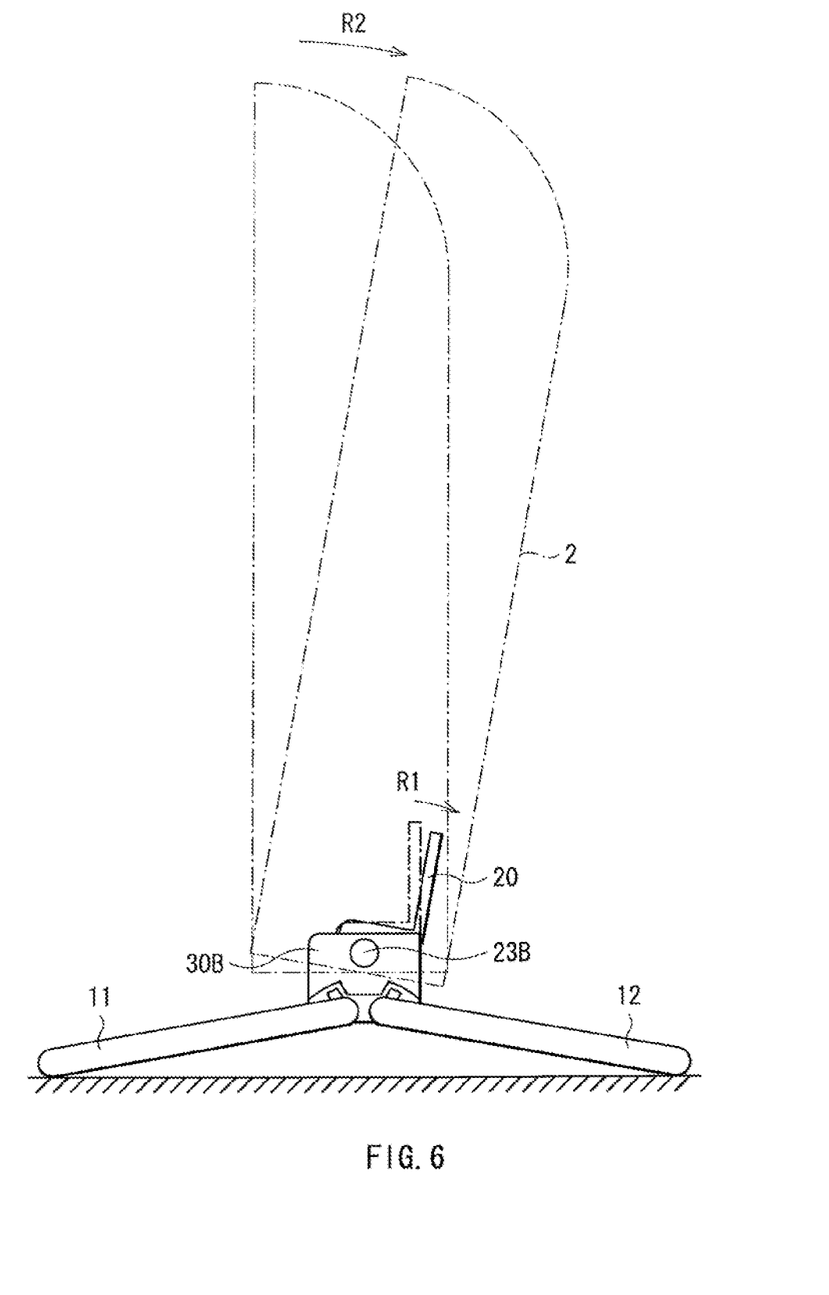
FIG. 6 is a view for explaining a change of an installation angle of a main body.

The bracket 20 illustrated in FIG. 4 is preferably rotatably fixed onto the two joint members 30A and 30B. Specifically, the ear portion 22A and 22B of the bracket 20 are rotatably fixed to the through-holes on the upper sides of the joint members 30A and 30B by screws 23A and 23B, and the thrust washers (not illustrated in the figure). Thereby, as illustrated in FIG. 6, in accordance with a rotation R1 of the bracket 20 by the thrust washers, the main body 2 fixed onto the attachment 21 is inclined in the direction of arrow R2, and it is possible to change the installation angle of the main body 2 by approximately 5 degrees. It is also possible to provide a slightly-inclined angle to the main body 2 by providing a click mechanism (not illustrated in the figure) or the like in screws fixing the bracket 20.

As illustrated in FIGS. 5A and 5B, as a rotation controlling structure, the stand 3 includes projections 11C and 12C in the vicinity of the position where the front arm 11 and the rear arm 12 are fixed to the joint members 30A and 30B, and includes concave grooves 31 and 32 on outer side faces of the joint members 30A and 30B. The projections 11C and 12C move within the concave grooves 31 and 32 in accordance with the opening and the closing of the front arm 11 and the rear arm 12, and when the front arm 11 and the rear arm 12 are maximally opened, the projections 11C and 12C are in contact with deepest faces 31A and 32A of the concave grooves 31 and 32, respectively. Thereby, a maximum opening angle θmax of the front arm 11 and the rear arm 12 with respect to the installation floor surface is controlled, and it is possible to securely support the weight of the main body 2. The maximum opening angle θmax of the front arm 11 and the rear arm 12 is not limited, and may be less than 180° as illustrated in FIGS. 5A and 5B, or 180°.

The display device 1 is, for example, assembled as will be described next.

Figure 7:
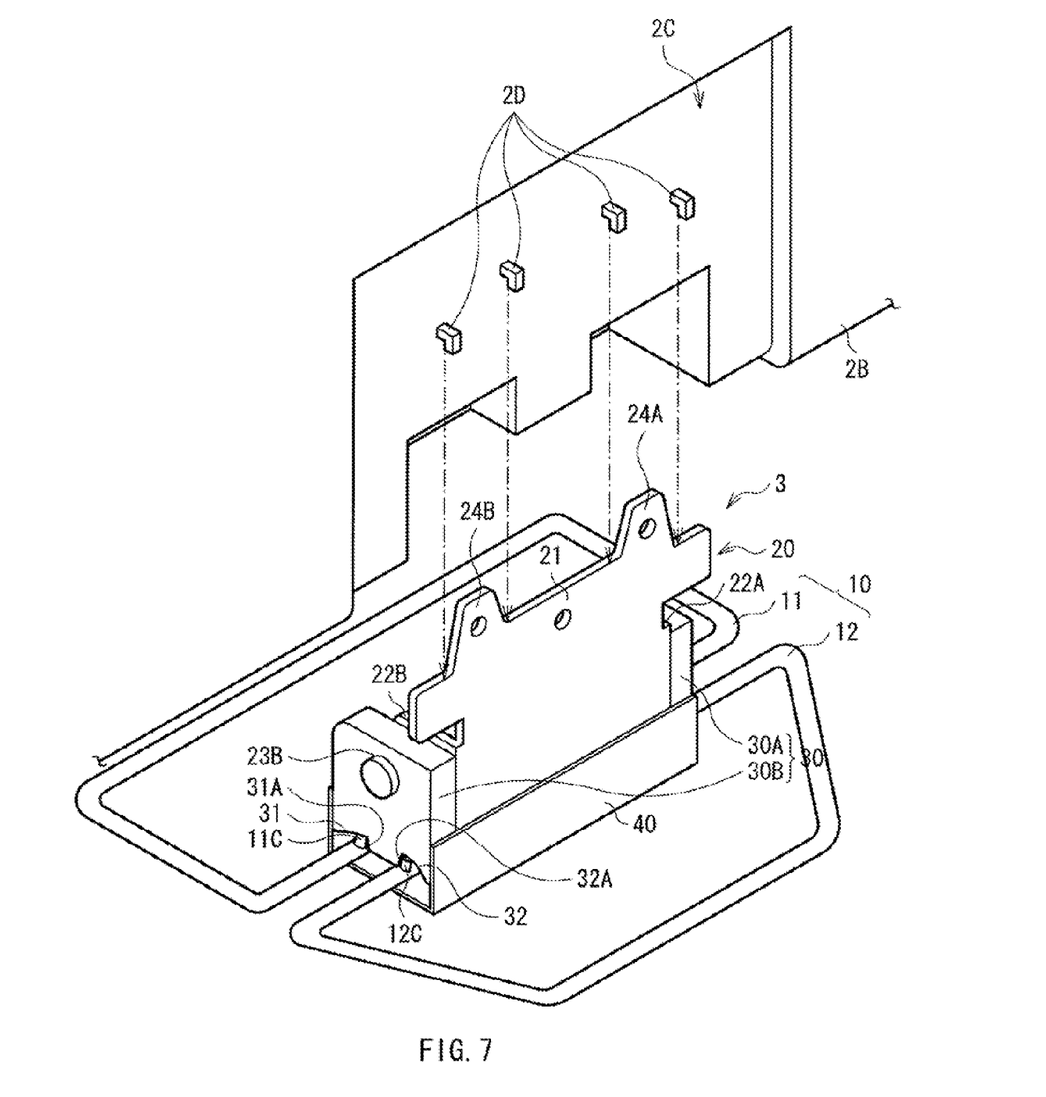
FIG. 7 is a partial exploded perspective view of the display device illustrated in FIG. 1 as viewed from the back side.

First, as illustrated in FIG. 7, the front arm 11 and the rear arm 12 are opened to place the stand 3 on the installation floor surface (not illustrated in the figure), and the main body 2 to be supported is brought down along the bracket 20 from above the stand 3.

Here, to accommodate the bracket 20 and the joint members 30A and 30B, the rear housing 2B of the main body 2 is provided with a concave 2C having an appropriate shape. In the concave 2C, for example, four hooks 2D locking to the upper side of the attachment 21 of the bracket 20 are provided. For positioning and preventing fall-out, the four hooks 2D are desirably provided in the position to lock to the both sides of two convexes 24A and 24B on the upper side of the attachment 21.

Figure 8:
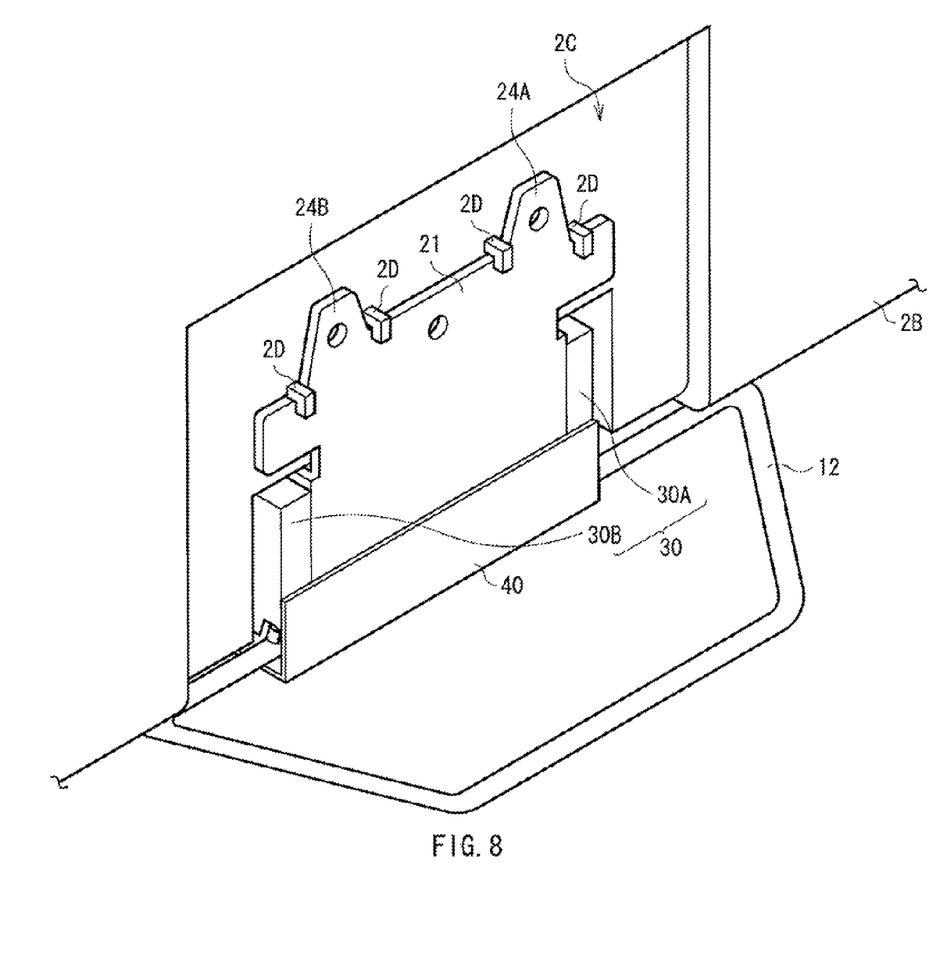
FIG. 8 is a perspective view illustrating an assembly step of the display device illustrated in FIG. 1.
Figure 9:
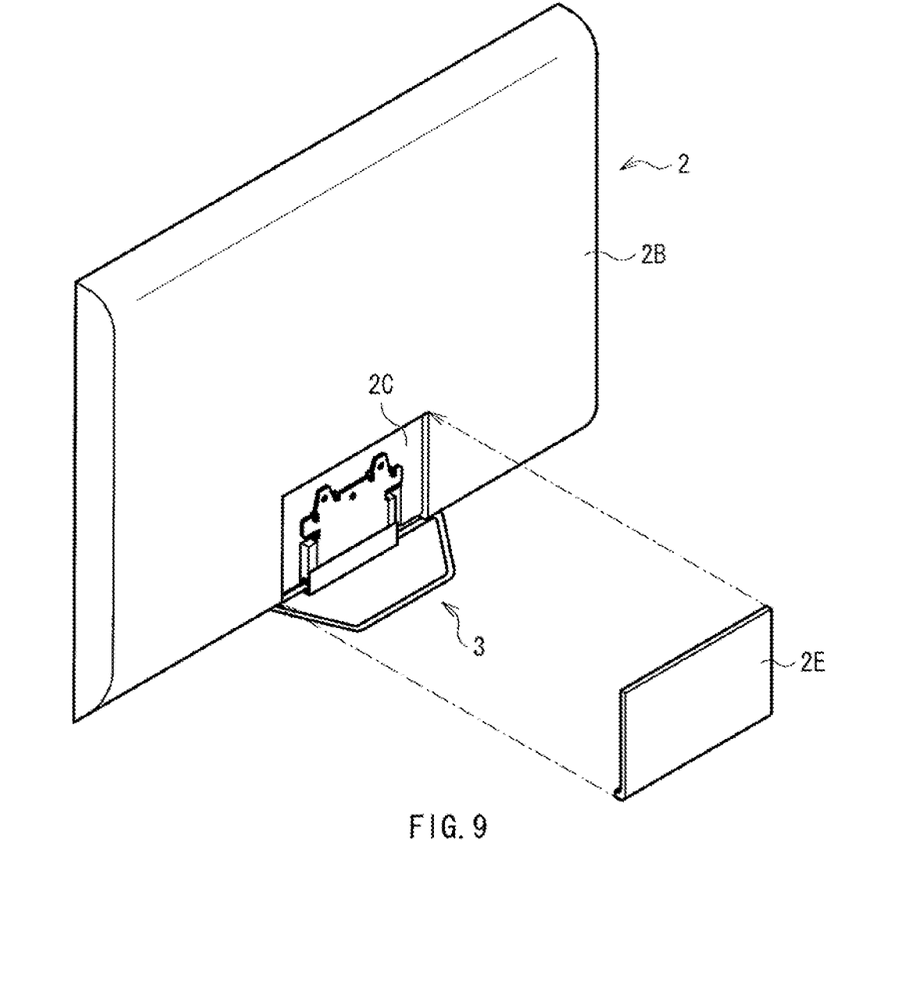
FIG. 9 is a perspective view illustrating a step subsequent to FIG. 8.

Next, as illustrated in FIG. 8, the hooks 2D are locked to the upper side of the attachment 21. Thereby, it is possible to securely install the main body 2 onto the attachment 21 with the simple operation. Further, by locking the hooks 2D to the both sides of the convexes 24A and 24B, positioning of the main body 2 is easy, and a shift and fall-out of the main body 2 are suppressed. If necessary, the attachment 21 may be fixed by screws onto the rear housing 2B by using screw holes of the attachment 21. After that, as illustrated in FIG. 9, the concave 2C is covered with a coyer 2E. As described above, assembly of the display device 1 illustrated in FIG. 1 is completed.

The display device 1 may be for example, disassembled as will be described next. First, as illustrated in FIG. 9, the cover 2E of the concave 2C of the rear housing 2B is removed. Next, in the case where the attachment 21 is fixed by screws onto the rear housing 2B, those screws are removed. Next, as illustrated in FIGS. 8 and 7, the main body 2 is moved upward to remove the hooks 2D from the upper side of the attachment 21, and it is thereby possible to separate the main body 2 from the attachment 21 with the simple operation. The concave 2C is covered with the cover 2E in the main body 2 separated from the attachment 21 as described above. Thereby, use of the main body 2 as a wall-hung display is realized with the simple operation, and it is possible to improve convenience of users.

The display device 1 may be, for example, packed and installed as will be described next.

Figure 10:
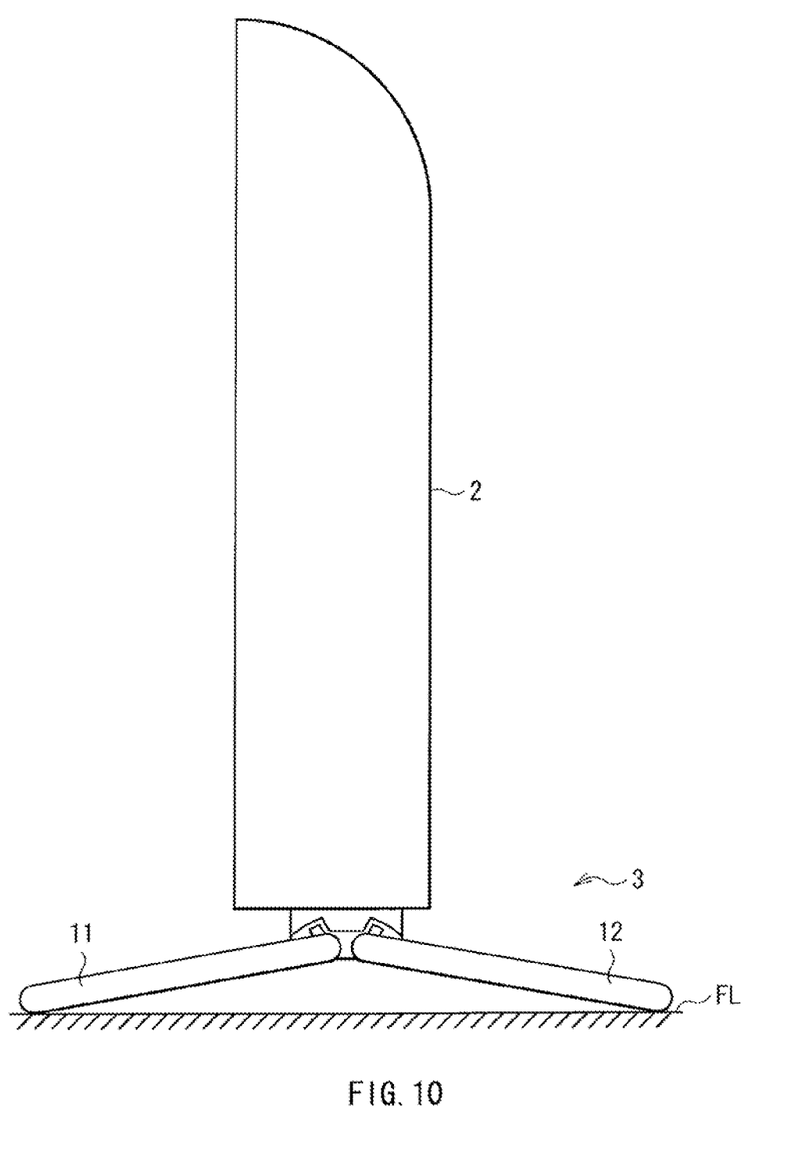
FIG. 10 is a side view illustrating the installation state of the display device illustrated in FIG. 1.
Figure 11:
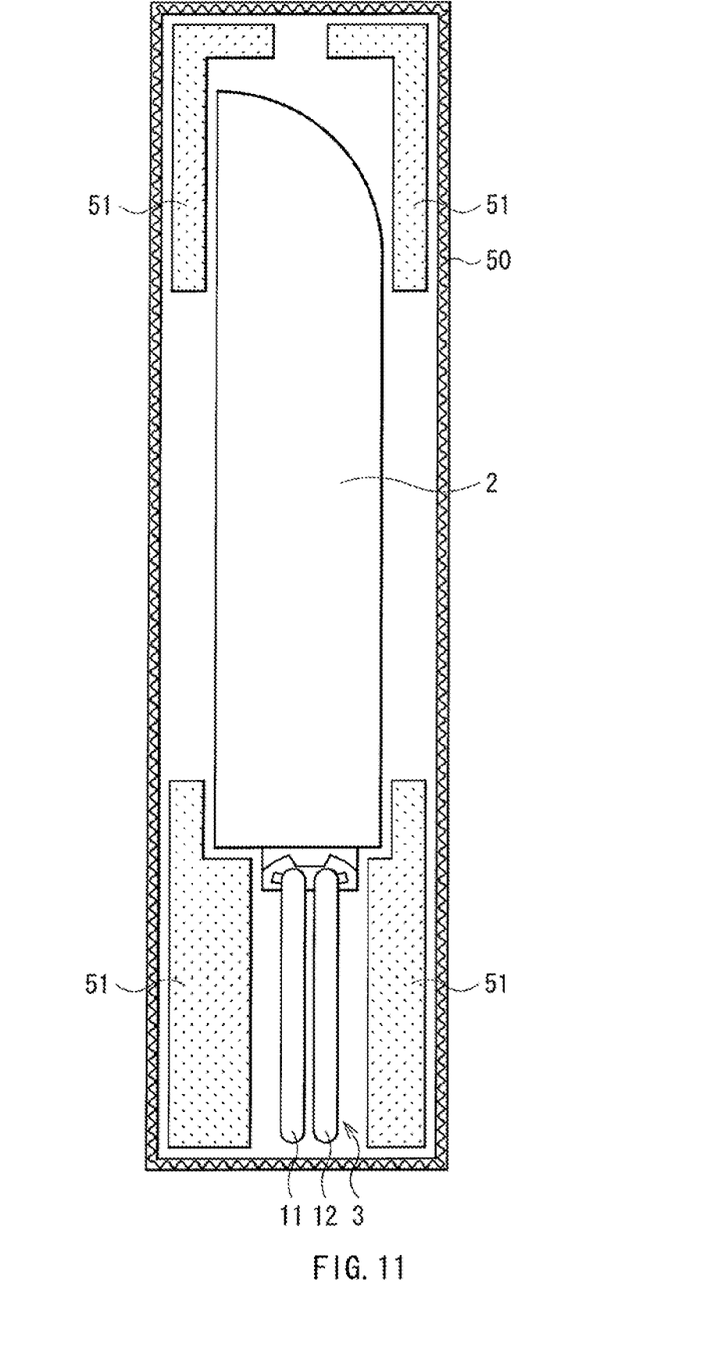
FIG. 11 is a side view illustrating an example of the packing state of the display device.

As illustrated in FIG. 10, the display device 1 is installed on a floor surface FL in the state that the front arm 11 and the rear arm 12 are opened. Here, the main body 2 is fixed onto the attachment 21 of the bracket 20, and the both ends of the attachment 21 are fixed onto the joint members 30A and 30B. Thus, the front arm 11 and the rear arm 12 are openable and closable without disassembly of the stand 3 from the main body 2. Therefore, as illustrated in FIG. 11, it is possible to pack the stand 3 attached onto the main body 2 in a package box 50 in the state that the front arm 11 and the rear arm 12 are closed. Thereby, the ratio (air area) occupied by cushions 51 maintaining the transporting strength can be reduced by 20% to 30%, and the volume of the package box 50 is reduced.

At the time of the installation, the main body 2 and the stand 3 are unpacked and taken out, and the front arm 11 and the rear arm 12 are opened as illustrated in FIG. 10, thereby enabling immediate installation without complicated assembly operation.

On the other hand, in the past, because a stand in which a supporting post stands on a flat bottom plate is used, in the case where the stand is removed from a main body, and the bottom plate and the supporting post are disassembled for packing, it has been the only way that the volume of a package box is made large to protect the main body with a cushion or the like. Thus, reduction of the transporting efficiency (cost increase) is generated. Further, complicated assembly operation is necessary at the time of the installation, and the number of steps in assembly (labor charge) is increased.

In this manner, in this embodiment, the front arm 11 and the rear arm 12 formed by bending the circular rods are the base 10, and the thread parts 11A and 11B at the both ends of the front arm 11 and the thread parts 12A and 12B at the both ends of the rear arm 12 screw into the through-holes of the joint members 30A and 30B. Thus, the front arm 11 and the rear arm 12 rotate to be openable and closeable by using the joint members 30A and 30B as the axis. Further, because the main body 2 to be supported is fixed onto the attachment 21 of the bracket 20, and the bracket 20 is fixed onto the joint members 30A and 30B, the front arm 11 and the rear arm 12 are openable and closable without disassembly of the stand 3 from the main body 2 to be supported. Therefore, it is possible to simplify the installation operation While the volume of the package box 50 is reduced.

Figure 12:
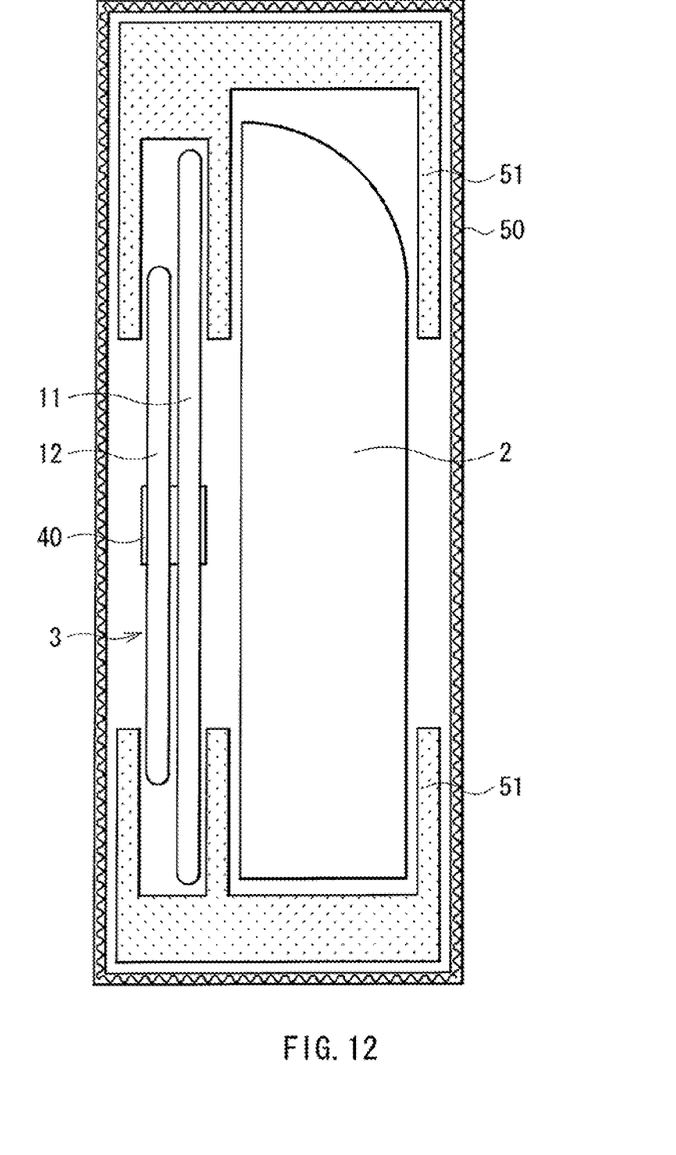
FIG. 12 is a top view illustrating another packing state of the display device.

Hereinbefore, although the present invention has been described with the embodiment, the present invention is not limited to the above-described embodiment, and various modifications may be made. For example, as illustrated in FIG. 11, although the case in which the stand 3 attached onto the main body 2 is packed in the package box 50 in the state that the front arm 11 and the rear arm 12 are closed has been described in the above-described embodiment, needless to say/it is also possible to pack the main body 2 and the stand 3 in the package box 50 after removing the stand 3 from the main body 2, as illustrated in FIG. 12. At that time, it is possible to assemble the display device 1 with more simple operation compared with the operation of the assembly procedures which have been described with reference to FIGS. 7 to 9.

Further, attachment components (not illustrated in the figure) made of a resin are installed on the top faces of the front arm 11 and the rear arm 12, and the bottom face of the main body 2 is in a contact with the attachment components. Thus, it is possible to disperse the weight of the main body 2 onto the front arm 11 and the rear arm 12.

Figure 13:
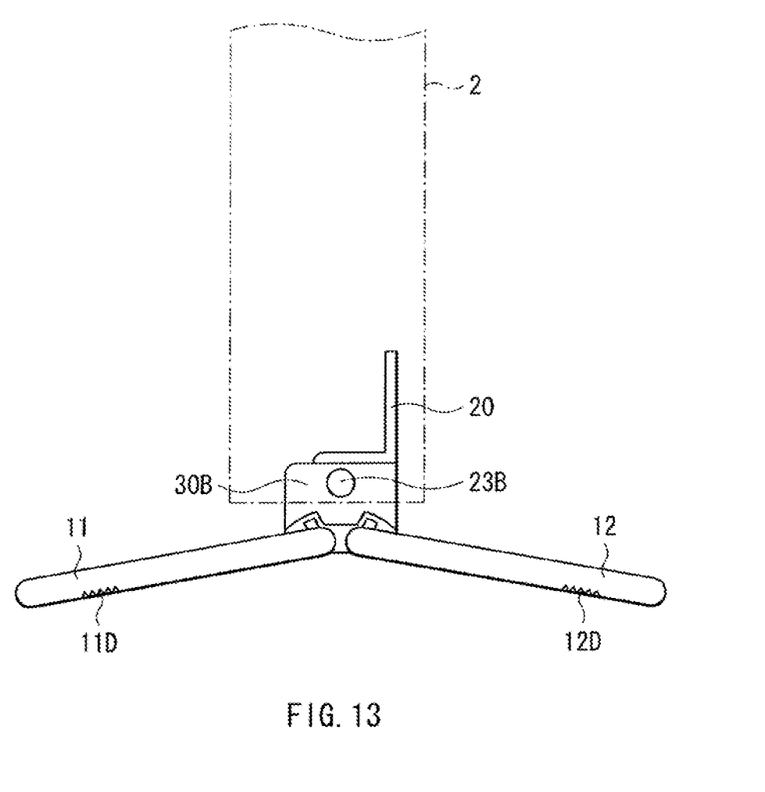
FIG. 13 is a view illustrating a modification of the stand.

Further, as illustrated in FIG. 13, nonslip structures 11D and 12D having concavo-convex shapes or made of an elastic resin may be provided in appropriate positions on the bottom faces of the front arm 11 and the rear arm 12. Thereby, even in the worst-case scenario that the base 10 protrudes from a desk, the display device 1 is unlikely to fall from the desk. The nonslip structures 11D and 12D may be formed, for example, by press-molding the bottom faces of the front arm 11 and the rear arm 12 in concavo-convex or zigzag shapes, or bonding an elastic resin onto the bottom faces of the front arm 11 and the rear arm 12.

The present application contains subject matter related to that disclosed in Japanese Priority Patent Application JP 2010-115241 filed in the Japan Patent Office on May 19, 2010, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A stand comprising:
   a base including a front arm and a rear arm each in which a rod including thread parts at both ends is bent with the both ends facing each other, the front arm and the rear arm being arranged such that the thread part at one end of the front arm and the thread part at one end of the rear arm are adjacent to each other, and the thread part at the other end of the front arm and the thread part at the other end of the rear arm are adjacent each other;
   a hinge unit including two joint members each of which has at least two through-holes that are not coaxial, and arranged such that at least one of the two through-holes on a first joint member is coaxial with one of the two through-holes on a second joint member, the thread part at the one end of the front arm and the thread part at the one end of the rear arm screw into one of the through-holes of the two joint members, and the thread part at the other end of the front arm and the thread part at the other end of the rear arm screw into the other of the through-holes of the two joint members; and
   a bracket including an attachment fixed onto an object to be supported, and fixed onto the two joint members.

2. The stand according to claim 1, wherein the bracket is rotatably fixed onto the two joint members.

3. The stand according to claim 2, further comprising a projection provided in each of the front arm and the rear arm, and a rotation controlling mechanism including a concave groove provided on an outer side face of each of the joint members, wherein
   the projection moves within the concave groove in accordance with opening and closing of the front arm and the rear arm, and the projection is brought into contact with a deepest face of the concave groove when the front arm and the rear arm are maximally opened.

4. The stand according to claim 3, further comprising a nonslip structure having a concavo-convex shape or made of an elastic resin on a bottom face of each of the front arm and the rear arm.

5. The stand according to claim 3, further comprising a nonslip structure having a zigzag shape on a bottom face of each of the front arm and the rear arm.

6. The stand according to claim 1, wherein the rod has a polygonal shaped cross-section in portions other than the thread parts.

7. The stand according to claim 1, wherein the rod is bent into a trapezoidal shape.

8. The stand according to claim 1, further comprising a click mechanism to incrementally change an angle of the bracket with respect to the joint members.

9. A display device comprising a flat-plate main body displaying an image, and a stand regarding the main body as an object to be supported, wherein the stand includes:
   a base including a front arm and a rear arm each in which a rod including thread parts at both ends is bent with the both ends facing each other, the front arm and the rear arm being arranged such that the thread part at one end of the front arm and the thread part at one end of the rear arm are adjacent to each other, and the thread part at the other end of the front arm and the thread part at the other end of the rear arm are adjacent each other;
   a hinge unit including two joint members each of which has at least two through-holes that are not coaxial, and arranged such that at least one of the two through-holes on a first joint member is coaxial with one of the two through-holes on a second joint member, the thread part at the one end of the front arm and the thread part at the one end of the rear arm screw into one of the through-holes of the two joint members, and the thread part at the other end of the front arm and the thread part at the other end of the rear arm screw into the other of the through-holes of the two joint members; and
   a bracket including an attachment fixed onto an object to be supported, and fixed onto the two joint members.

10. The display device according to claim 9, further comprising a hook locking to an upper part of the bracket, on a back of the main body.

11. The display device according to claim 9, wherein the bracket is rotatably fixed onto the two joint members.

12. The display device according to claim 11, further comprising a projection provided in each of the front arm and the rear arm, and a rotation controlling mechanism including a concave groove provided on an outer side face of each of the joint members, wherein
   the projection moves within the concave groove in accordance with opening and closing of the front arm and the rear arm, and the projection is brought into contact with a deepest face of the concave groove when the front arm and the rear arm are maximally opened.

13. The display device according to claim 12, further comprising a nonslip structure having a concavo-convex shape or made of an elastic resin on a bottom face of each of the front arm and the rear arm.

14. The display device according to claim 12, further comprising a nonslip structure having a zigzag shape on a bottom face of each of the front arm and the rear arm.

15. The display device according to claim 9, wherein the stand includes a click mechanism to incrementally change an angle of the bracket with respect to the joint members.

16. The display device according to claim 9, wherein the rod has a polygonal shaped cross-section in portions other than the thread parts.

17. The display device according to claim 9, wherein the rod is bent into a trapezoidal shape.

18. The display device according to claim 9, further comprising attachment components made of a resin attached to the main body and to top faces of the front arm and the rear arm.

19. The display device according to claim 9, further comprising a cover that covers the hinge unit.

* * * * *